US012752597B2

(12) United States Patent
Malone

(10) Patent No.: US 12,752,597 B2
(45) Date of Patent: Oct. 6, 2026

(54) FLOW SCHEME FOR SWITCH PUMP WITH FOUR POSITIONS

(71) Applicant: Cooper-Standard Automotive Inc., Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 552 days.

(21) Appl. No.: 18/207,514

(22) Filed: Jun. 8, 2023

(65) Prior Publication Data

US 2023/0406065 A1 Dec. 21, 2023

Related U.S. Application Data

(60) Provisional application No. 63/352,624, filed on Jun. 15, 2022.

(51) Int. Cl.
*B60H 1/00* (2006.01)

(52) U.S. Cl.
CPC ................................ *B60H 1/00899* (2013.01)

(58) Field of Classification Search
CPC ............ B60H 1/00485; B60H 1/00885; B60H 1/00899; B60H 1/143; B60H 1/00278; B60H 2001/00307; F04D 13/14; F04D 15/0072
See application file for complete search history.

(56) References Cited

U.S. PATENT DOCUMENTS

| | | | | |
|---|---|---|---|---|
| 3,733,816 A * | 5/1973 | Nash | .......................... | F02C 7/16 60/39.83 |
| 4,392,777 A * | 7/1983 | Huttlin | .................... | F24F 3/044 415/167.1 |
| 2022/0134839 A1* | 5/2022 | He | ..................... | B60H 1/00485 165/203 |
| 2024/0198763 A1* | 6/2024 | Ok | ......................... | B60K 11/02 |

FOREIGN PATENT DOCUMENTS

| | | | | |
|---|---|---|---|---|
| CN | 112855550 A * | 5/2021 | ........... | F04D 29/445 |
| DE | 102018220150 A1 * | 5/2020 | .............. | F01P 7/165 |
| EP | 3954559 A1 | 2/2022 | | |
| KR | 20220011953 A | 2/2022 | | |
| WO | WO-2022225085 A1 * | 10/2022 | ............. | B60K 11/02 |

OTHER PUBLICATIONS

Search Report for 23179172.4 dated Nov. 17, 2023.

* cited by examiner

*Primary Examiner* — Frantz F Jules
*Assistant Examiner* — Martha Tadesse
(74) *Attorney, Agent, or Firm* — Paschall & Associates, LLC; James C. Paschall; Anthony Miologos

(57) ABSTRACT

A process for cooling a heat generating component of a vehicle including pumping a coolant fluid from a pump having a first impeller and a second impeller, the pump switchable from a chilling mode, a heating mode, an isolated state, and a linked state; and while the pump is in the chilling mode and the isolated state, pumping the coolant fluid with the first impeller through a first loop of a heater module, and a cabin heat exchanger, and pumping the coolant fluid with the second impeller through a second loop of a component heat exchanger and a chiller module.

20 Claims, 9 Drawing Sheets

FLOW SCHEME FOR SWITCH PUMP WITH FOUR POSITIONS

FIELD

The field is generally related to a pump for switching flow to heat generating or absorbing components.

BACKGROUND

Pumps are known and commonly used to move fluids, such as coolant in a vehicle. One example is cooling systems with water pumps, which are used for the cooling of different electrical or mechanical components of a vehicle. In hybrid or purely electric vehicles, electrical components need to be cooled. Valves are used to ensure the distribution of the coolant throughout the cooling system. The valves each require an actuator with electrical control and a holder on a component of the vehicle, which results in high component costs.

In some vehicles, more than one cooling loop may be employed to cool heat generating components and to modulate the temperature of the driver cabin. Each loop requires a pump and a valve to direct flow through the appropriate loop.

It is an object of the present disclosure to employ a pump with an integrated valve that can control the flow from the pump through a plurality of outlets using a minimal set of components.

SUMMARY

This disclosure relates to a process for cooling a heat generating component of a vehicle including pumping a coolant fluid from a pump having a first impeller and a second impeller. The pump is switchable from a chilling mode, a heating mode, an isolated state, and a linked state. While the pump is in the chilling mode and the isolated state, pumping the coolant fluid with the first impeller through a first loop comprising a heater module, and a cabin heat exchanger, and pumping the coolant fluid with the second impeller through a second loop comprising a component heat exchanger and a chiller module.

This disclosure also relates to an apparatus for cooling a heat generating component of a vehicle. The apparatus has a first loop comprising a heater module and a cabin heat exchanger, and a second loop comprising a component heat exchanger and a chiller module. The apparatus also has a pump having a first impeller and a second impeller. The pump is switchable among four positions by a valve including combinations of a chilling mode, a heating mode, an isolated state, and a linked state. When the pump is in the linked state, the second impeller is in direct downstream communication with the first impeller. When the pump is in the isolated state, the first impeller pumps a coolant fluid through the first loop only and the second impeller pumps coolant fluid through the second loop only.

The disclosure also relates to a process for cooling a heat generating component of a vehicle. The process includes pumping a coolant fluid from a pump having a first impeller and a second impeller. The pump is switchable from a chilling mode, a heating mode, an isolated state, and a linked state. While the pump is in the chilling mode and the isolated state, pumping the coolant fluid with the first impeller through a first loop comprising a heater module, and a cabin heat exchanger. And pumping the coolant fluid with the second impeller through a second loop comprising a component heat exchanger and a chiller module. While the pump is in the chilling mode and the linked state, the first impeller pumps the coolant fluid to the second impeller and the second impeller pumps the coolant fluid through the first loop and the second loop.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DEFINITIONS

The term "communication" means that fluid flow is operatively permitted between enumerated components, which may be characterized as "fluid communication". The term "communication" may also mean that data or signals are transmitted between enumerated components which may be characterized as "informational communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

DETAILED DESCRIPTION

The Figures, discussed below, and the various embodiments used to describe the principles of the present disclosure in this patent document are by way of illustration only and should not be construed in any way to limit the scope of the invention. Those skilled in the art will understand that the principles of the invention may be implemented in any type of suitably arranged device or system.

Figure 1:
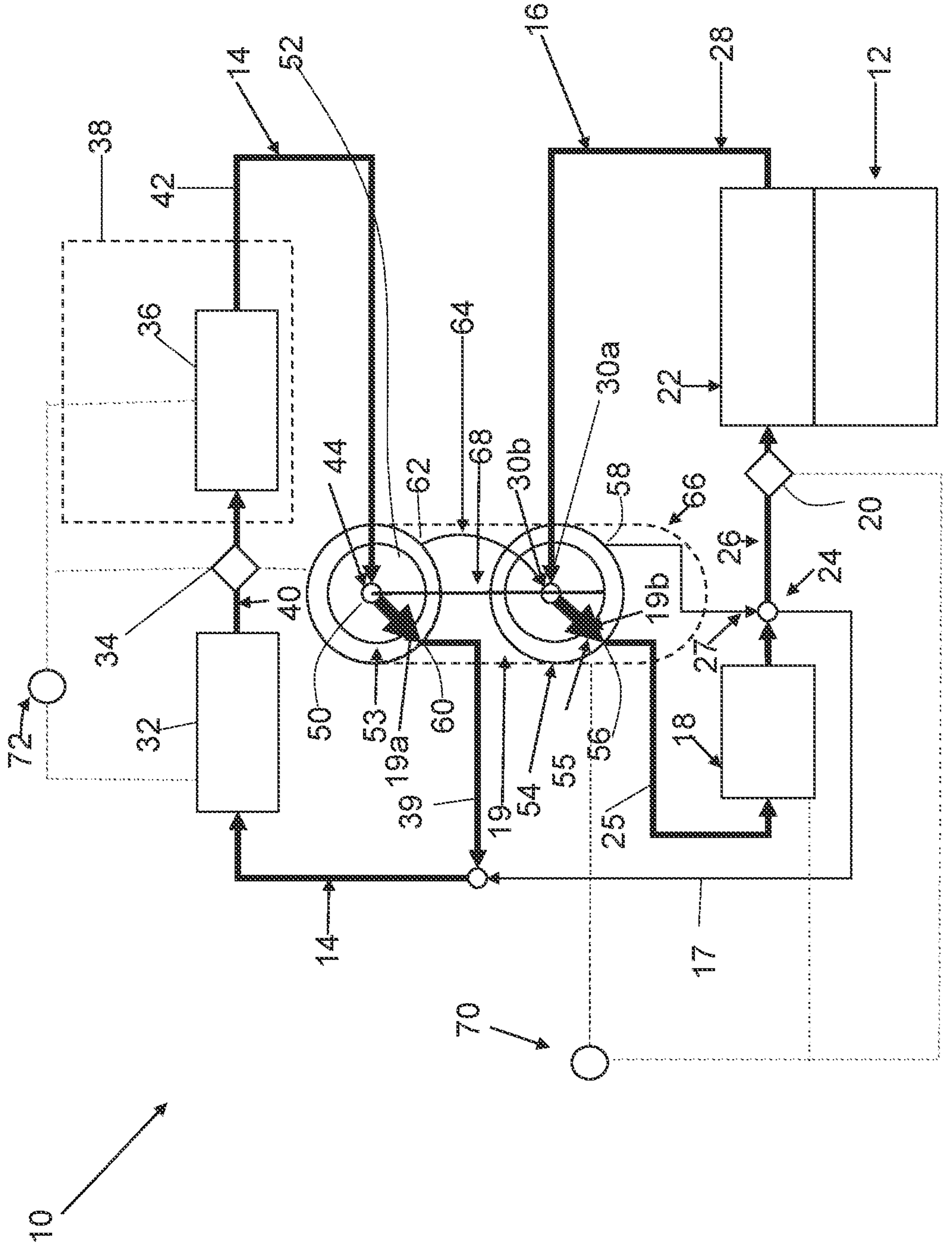
FIG. 1 illustrates a schematic view of a system of the present disclosure.

FIG. 1 depicts a system 10 for regulating the temperature of a heat generating component 12 of a vehicle. The heat generating component 12 may be a battery for powering a hybrid or an electrical vehicle. The system 10 can also be employed to modulate temperature in a driver cabin 38. The system 10 may include a first loop 14 and a second loop 16.

The system 10 includes a pump 50 having a first impeller 52 in a first impeller chamber 53 and a second impeller 54 in a second impeller chamber 55. A mixing chamber 59 best seen in FIG. 5 separates the first and second impeller chambers. A valve 19 has a first end 19*a* in the first impeller chamber and an opposed second end 19*b* in the second impeller chamber. The first and second impellers 52, 54, their respective chambers 53, 55 the mixing chamber 59, and the valve 19 are inside a pump housing 66. The first impeller and the second impeller are mounted on an axle 68 for co-rotation there about. The valve 19 is moveable by an actuator motor 63 (FIG. 5) by a controller (not shown) to place the pump in one of four switch positions described in greater detail below.

The first impeller chamber 53 has a first fluid inlet 44, a first outlet 60 and a second outlet 62. The second impeller chamber 55 has a second fluid inlet 30*a* and a third fluid inlet 30*b* which may be located in the mixing chamber 59 shown in FIG. 5. As described in greater detail below, when the pump is in an isolated state, the second impeller chamber 55 receives fluid from the second fluid inlet 30*a*. When the pump is in a linked state, the second impeller chamber 55 receives fluid from both the second and third fluid inlets 30*a*,30*b*. An outlet of the mixing chamber directly communicates with the second impeller chamber 55. The second impeller chamber 55 has a third outlet 56 and a fourth outlet 58. A jumper line 64 connects the second fluid outlet 62 to the third fluid inlet 30*b* The pump 50 pumps a coolant fluid through the first loop 14 and the second loop 16.

The first loop 14 comprises a heater module 32 and a cabin heat exchanger 36. The second loop 16 comprises a chiller module 18 and a component heat exchanger 22.

Figure 2:
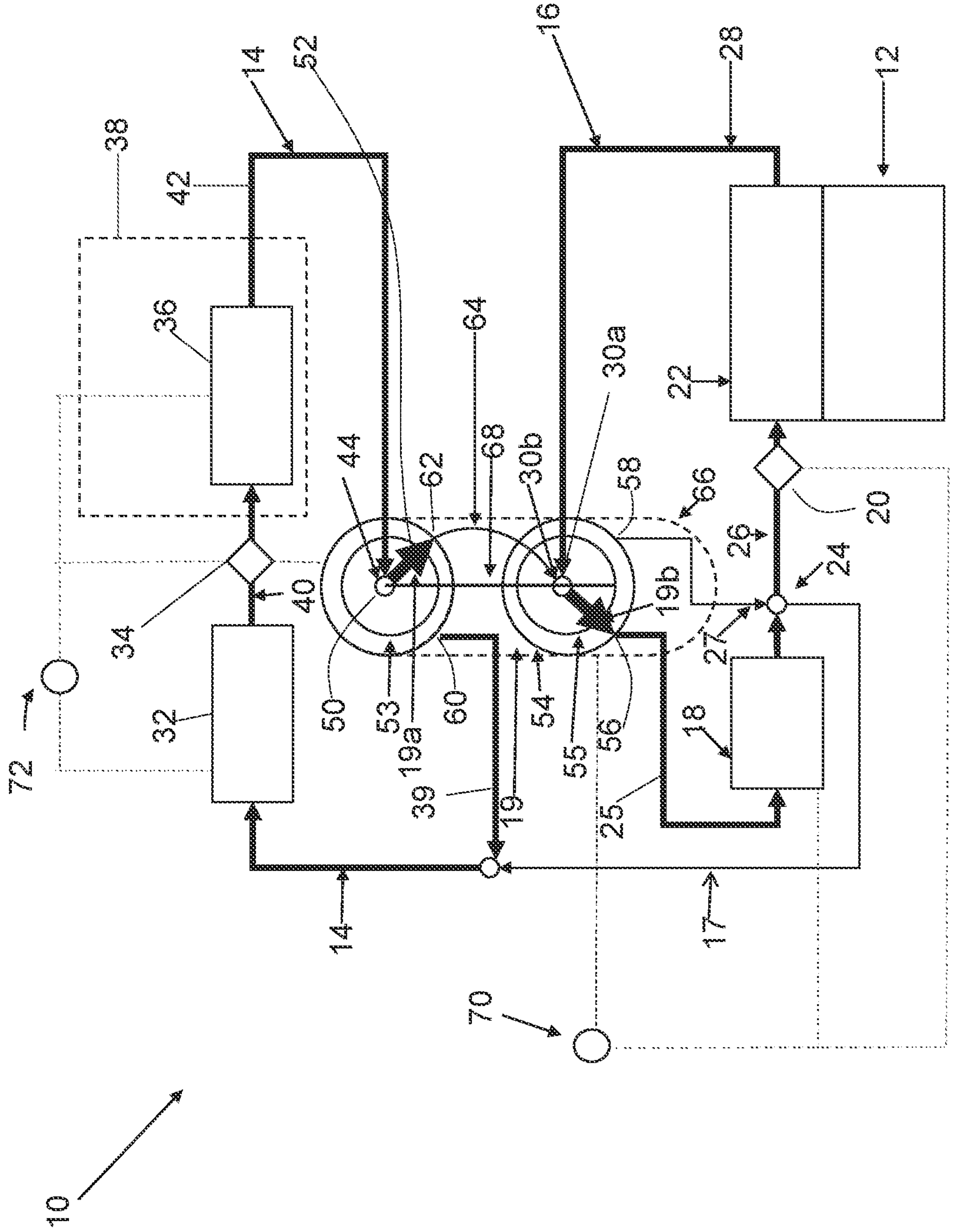
FIG. 2 illustrates a schematic view of a system of the present disclosure.
Figure 3:
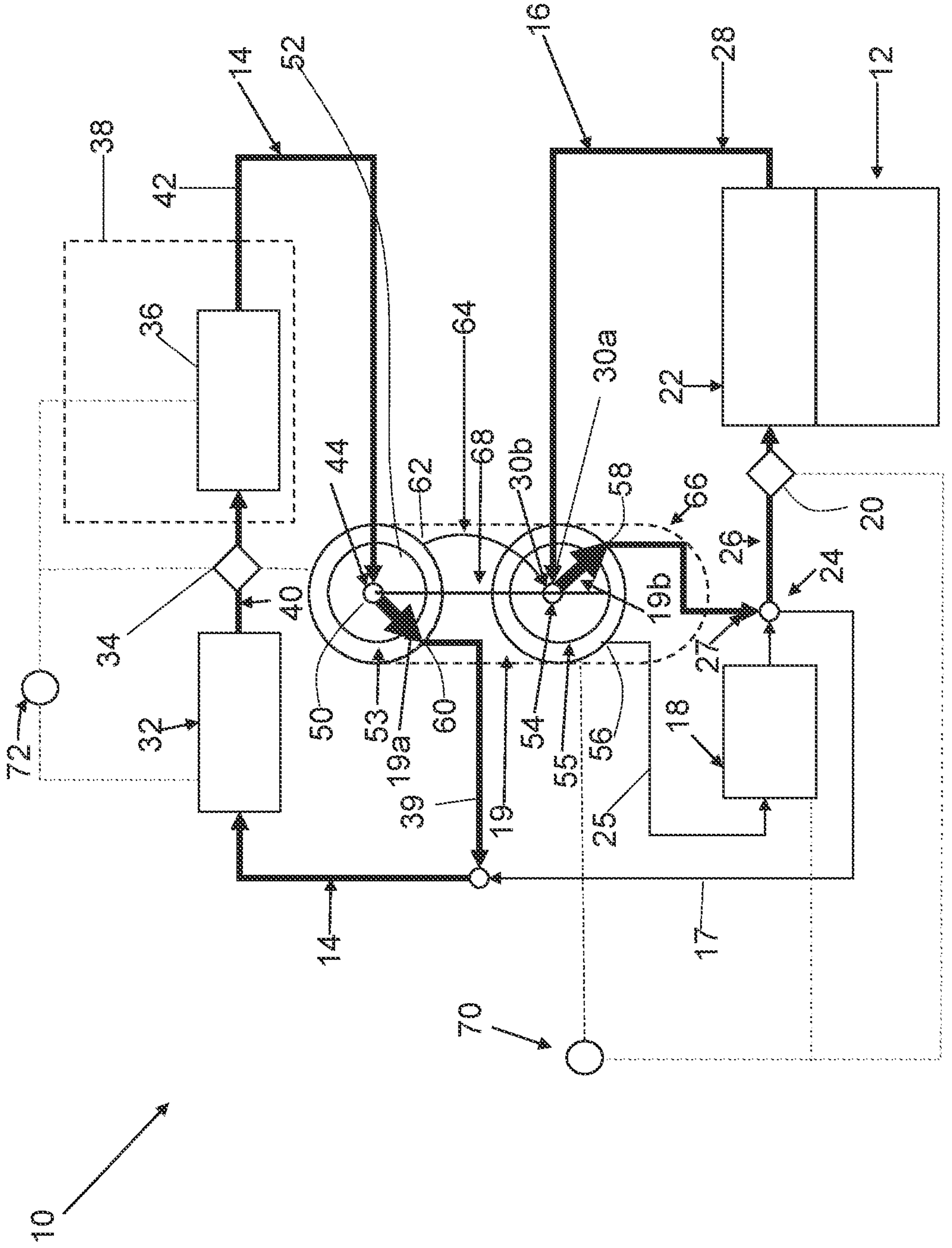
FIG. 3 illustrates a schematic view of a system of the present disclosure.
Figure 4:
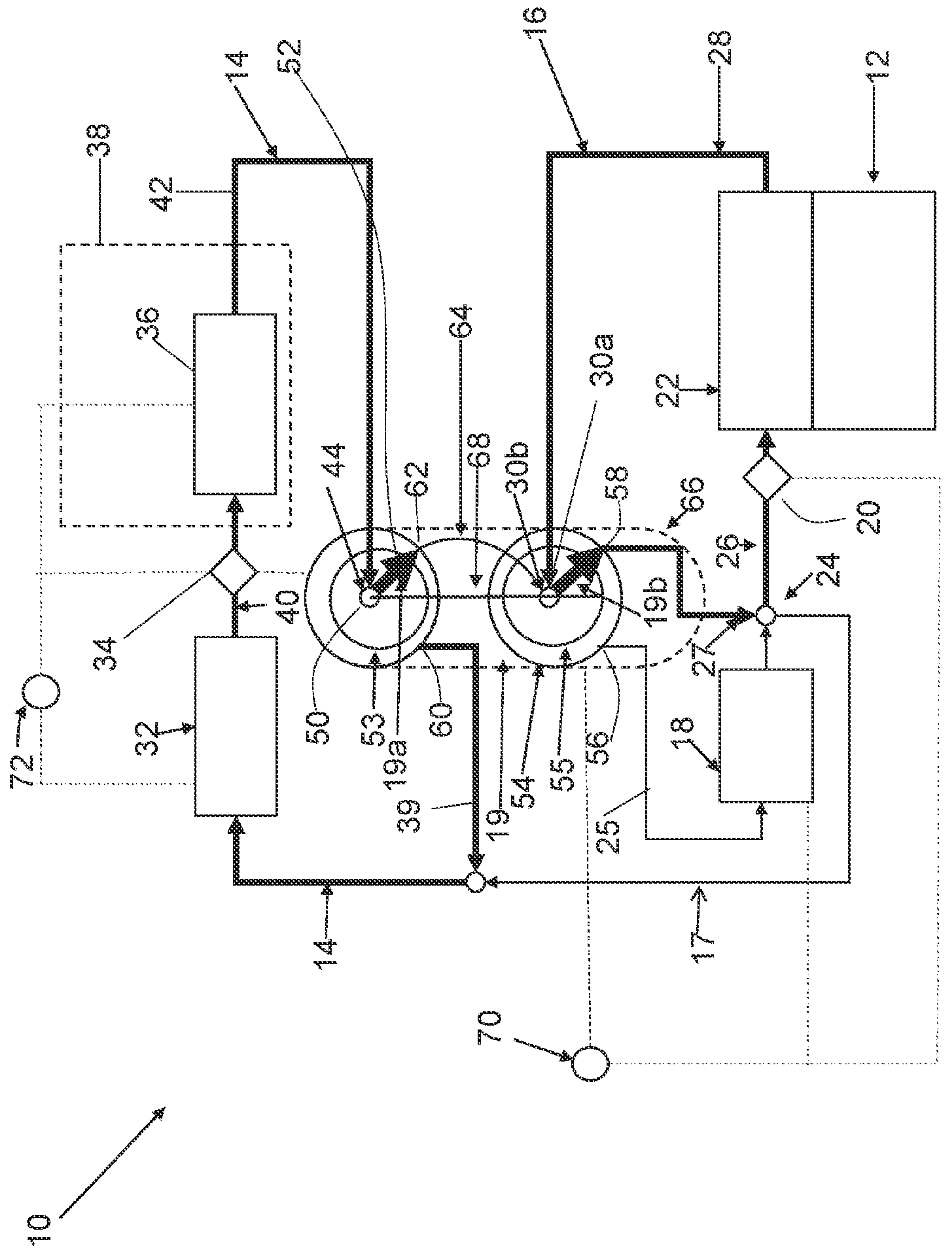
FIG. 4 illustrates a schematic view of a system of the present disclosure.

The pump 50 is switchable between four positions of a combination of two modes and two states by positioning of valve 19. The two modes are chilling and recirculation or heating. Recirculation is a form of heating using waste heat from the batteries. For the sake of convenience, we will refer to the recirculation mode as the heating mode. The position of valve 19*b* determines whether the pump is in the chilling or heating mode. The two states are isolated and linked which are selected by the position of 19*a* of the valve. FIG. 1 shows the pump 50 in the first position of the chilling mode and the isolated state. FIG. 2 shows the pump 50 in the second position of the chilling mode and the linked state. FIG. 3 shows the pump 50 in the third position of the heating mode and the isolated state. FIG. 4 shows the pump 50 in the fourth position of the heating mode and the linked state. These combinations of modes and states will now be discussed.

FIG. 1 shows that when the pump is in the first switch position of the chilling mode and the isolated state, coolant fluid is received in the first impeller chamber 53 from the first fluid inlet 44. Valve end 19*a* opens an outlet 60 and closes an outlet 62. The valve end 19*b* opens an outlet 56 and closes an outlet 58. The coolant fluid is pumped by the first impeller 52 through the outlet 60 through line 39 of the first loop 14 into the heater module 32 and then to the cabin heat exchanger 36 in a cabin 38 of a vehicle. The first loop 14, thus, is in direct downstream communication with the first impeller chamber 53. When the pump is in the isolated state, the heater module 32 will be off or on based on whether there is a request to cool or warm the cabin respectively.

Also, when in the first switch position, the second impeller chamber 55 receives fluid from the inlet 30*a* via mixing chamber 59. The second impeller 54 pumps coolant fluid through the outlet 56 and line 25 through the second loop 16 to the chiller module 18. The chiller module 18 can be in an on state or an off state depending on the temperature of the heat generating component 12. When the heat generating component needs cooling, the chiller module 18 will be in the on state. The second loop 16, thus, is in direct downstream communication with the second impeller chamber 54. The coolant fluid flows through line 26 through a junction 24, through a second sensor 20, and then into the heat exchanger 22 to possibly cool the heat generating component 12.

When on, the chiller module 18 cools the coolant fluid by means of a device such as a Peltier electric device. A Peltier electric device applies a current through a junction connecting two metals to absorb heat at the junction to balance the difference in the chemical potential of the two metals to produce a cooling effect. Coolant fluid exiting the heat exchanger 22 is directed through line 28 to an inlet 30*a* of the second impeller chamber 55. Thus, when the pump 50 is in the first switch position, the chilling mode and the isolated state, the first loop 14 is isolated from the second loop 16. Thus, the chiller module 18 and the heater module 32 are operated independently based on the needs of the battery and the cabin temperature respectively. However, the first and second loops do communicate, minorly due to fluid expansion and contraction through line 17.

FIG. 2 shows the pump 50 in the second switch position in the heating mode and the linked state. The valve end 19*a* opens outlet 62 and closes outlet 60. The valve end 19*b* opens outlet 56 and closes outlet 58. The first impeller chamber 53 receives fluid through the first fluid inlet 44 and pumps the coolant fluid through outlet 62, through fluid jumper line 64, into the third fluid inlet 30*b* of the mixing chamber 59, then into the second impeller chamber 55. The mixing chamber 59 also receives fluid from the second fluid inlet 30*a*. The second impeller 54 pumps the coolant fluid out through outlet 56 and through line 25 into the chiller unit 18. The chiller unit will be on if the heat generating component 12 needs cooling. The coolant fluid is conveyed through line 26 through junction 24 where the coolant is split into two streams. A first stream flows minorly through line 26 based on flow resistance through the second sensor into the heat exchanger 22 to possibly cool the heat generating component 12. A second stream flows through line 17 to the heater module 32, which is off or on based on whether the cabin air temperature is above or below the desired temperature respectively. The coolant then flows through the first sensor 34 into the cabin heat exchanger 36 to possibly cool the air in the cabin 38 and then returns through line 42 to the inlet 44 of the first impeller chamber 53.

FIG. 3 shows the pump 50 in the third switch position in the heating mode and the isolated state. The valve end 19*a* opens outlet 60 and closes outlet 62. The valve end 19*b* opens outlet 58 and closes outlet 56. The first impeller 52 receives fluid through the first inlet 44 and pumps the coolant fluid through outlet 60 and line 17 to the heat exchanger 32 which is on or off based on the temperature of the cabin 38. When on, the heat exchanger 32 heats the coolant fluid by a device such as a Seebeck device which operates on the reverse principle as a Peltier electrical device described above for the chiller module 18. The heated coolant flow through line 40, through the first sensor 34, into the cabin heat exchanger 36 to possibly warm the air in the cabin 38. The second impeller 54 pumps the coolant fluid through outlet 58 and lines 27 and 26 directly to the heat exchanger 22 bypassing the chiller module 18 which is off. The coolant fluid is conveyed by line 28 back to the second impeller chamber 54. Loops 1 and 2 are isolated and the coolant fluid flows independently through them. However, loops 1 and 2 do minorly communicate through line 17 due to fluid expansion and contraction keeping the loops 1 and 2 in equilibrium.

FIG. 4 shows the pump in the fourth switch position of the heating mode and the linked state. The valve end 19*a* opens outlet 62 and closes outlet 60. The valve end 19*b* opens outlet 58 and closes outlet 56. The first impeller chamber 53 receives fluid from the first fluid inlet 44. The first fluid impeller 52 pumps coolant fluid through outlet 62, through fluid jumper line 64, into the mixing chamber 59 via the third fluid inlet 30*b*, and then into the second impeller chamber 55. The second impeller 54 pumps the coolant fluid through outlet 58 and lines 27 and 26 directly to the heat exchanger 22 bypassing the chiller module 18 which is off. The coolant fluid is conveyed by line 28 back to the second impeller chamber 55.

The second sensor 20 senses the temperature of coolant in line 26 entering the component heat exchanger 22. The sensor 20 sends a signal to a controller 70 for signaling the pump to operate in the heating mode and to turn the chiller module 18 off. The first sensor 20 may send a signal directly to the pump 50 or the chiller module 18.

Figure 5:
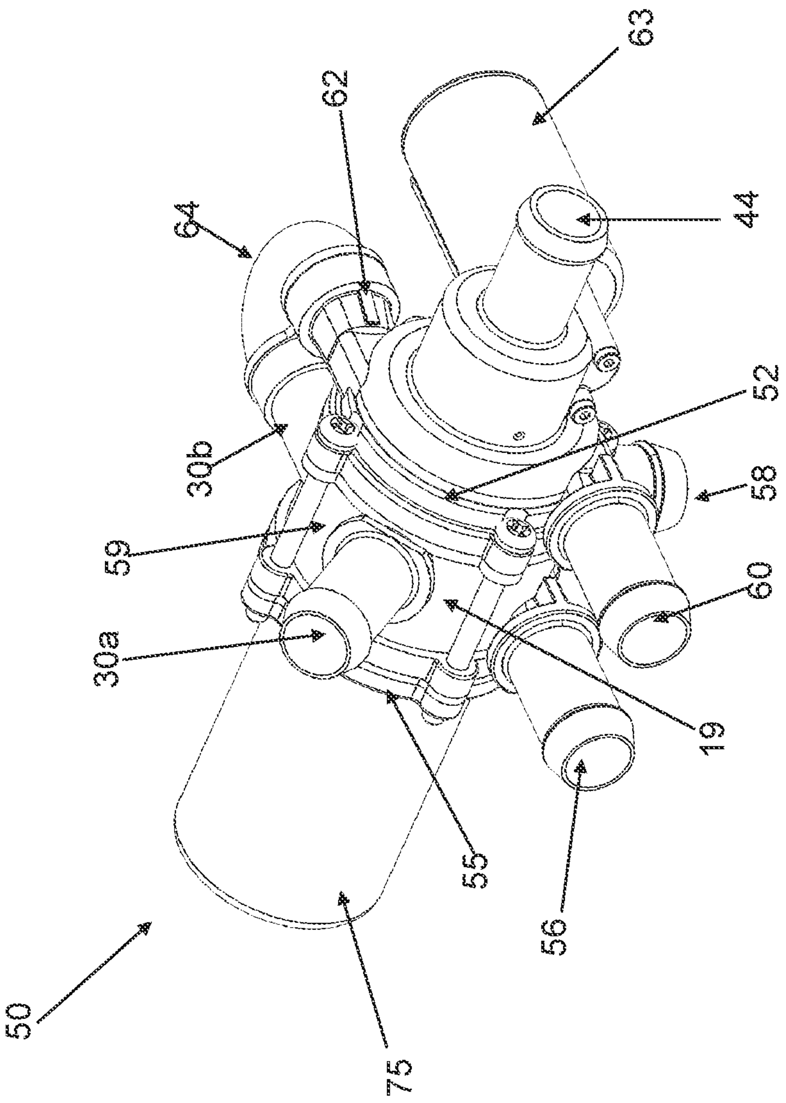
FIG. 5 illustrates a perspective view of a pump of the present disclosure.

FIG. 5 illustrates an example of a pump 50 for pumping the coolant in a vehicle. As can be appreciated, the pump 50 may also be used in non-vehicle applications. The pump 50 is an integration of a pump 50 and a valve 19 positioned by an actuator motor 63 for switching between four flow paths. The pump 50 includes the first impeller 52 (FIGS. 6-9) in the first impeller chamber 53, the second impeller 54 (FIGS. 6-9) in the second impeller chamber 55, the mixing chamber 59 between the two impeller chambers, the fluid jumper line 64 connecting the first impeller chamber 53 to the mixing chamber 59 and an electric motor 75 that engages the shaft 68 and causes it to rotate about its axis.

Figure 6A:
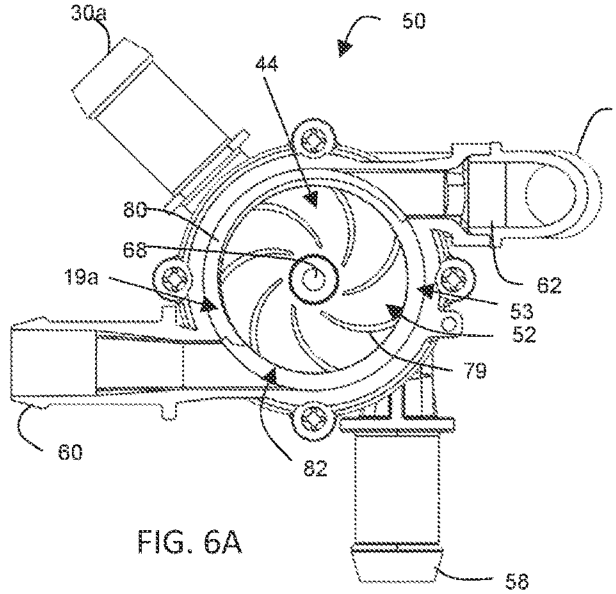
FIGS. 6A and 6B respectively illustrate a sectional view of a first impeller chamber and a second impeller chamber in a first switch position of a pump.
Figure 6B:
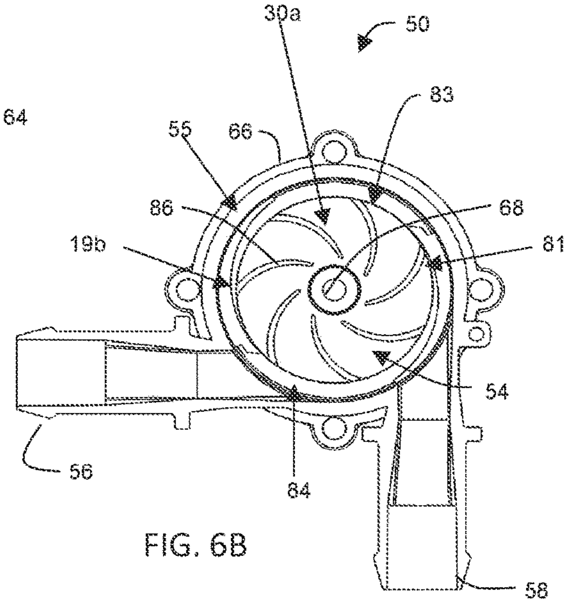

FIGS. 6A and 6B show the pump in the first switch position of the chilling mode and the isolated state of FIG. 1. The first impeller chamber 53 receives coolant fluid from inlet 44, and outlets 60 and 62 extend along lines 180° from one another. Inlet 44 is best seen in FIG. 5, but its flow is indicated by the lead line 44. The first impeller 52 has numerous spaced arcuate vanes 79 that push the coolant fluid from the first impeller chamber 53 when the impeller 52 is rotated about the shaft 68. The first valve end 19*a* has a first circular wall 80 with a first opening 82 that is in alignment with the outlet 60 to open outlet 60. A solid wall portion of the first circular wall 80 closes the outlet 62.

FIG. 6B shows a cross-sectional view of the second impeller chamber 55 that receives coolant fluid from inlet 30*a*. Inlet 30*a* is best seen in FIG. 5 but its flow is indicted by the led line for 30*a*. The second impeller chamber 55 has the outlets 56 and 58 disposed 90° from one another. The second valve end 19*b* has a second circular wall 81 with a second opening 83 and a third opening 84. The second circular wall 81 of the valve end 19*b* is connected to the first circular wall 80 of the first valve end 19*a* and rotates together therewith about a centrally disposed axis in response to the actuator motor 63. The third opening 84 is in alignment with the outlet 56 to open outlet 56. The second opening 83 is in alignment with the wall of the pump. A solid portion of the wall 81 is in alignment with outlet 58 to close outlet 58. The second impeller 54 also has arcuate vanes 86 that when the second impeller 54 is rotated about shaft 68 cause the coolant to flow through opening 56.

Figure 7A:
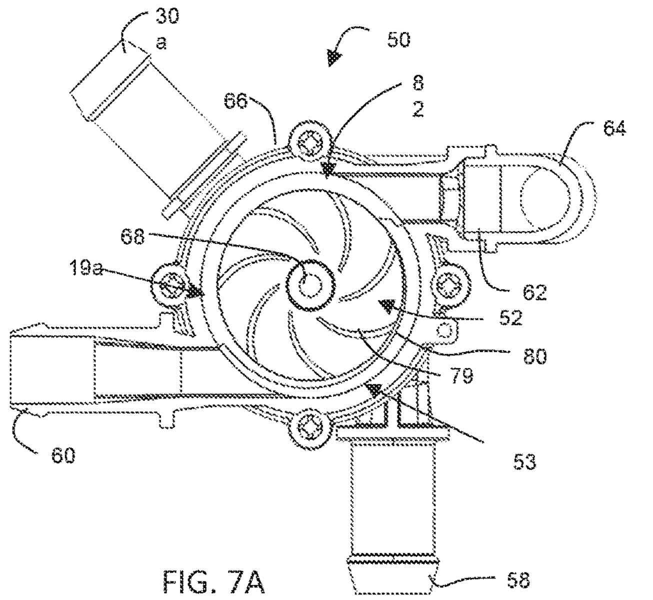
FIGS. 7A and 7B respectively illustrate a sectional view of a first impeller chamber and a second impeller chamber in a second switch position of a pump.
Figure 7B:
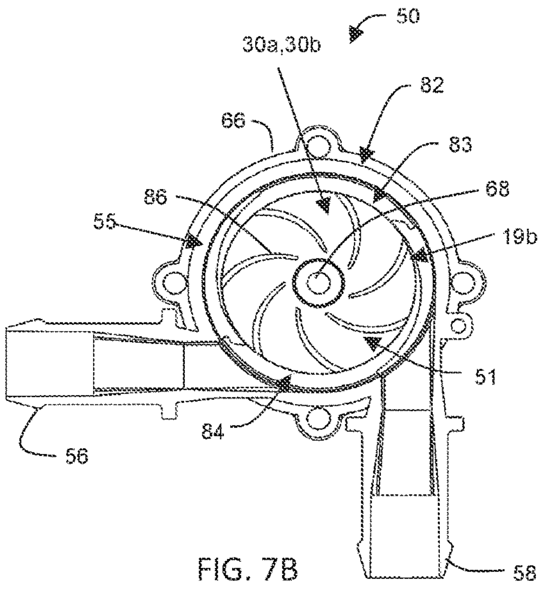

FIGS. 7A and 7B show the pump in the second switch position in the warming mode and the isolated state of FIG. 2. The valve 19 has been rotated 180° clockwise from the first switch position placing the first opening 82 into alignment with outlet 62 and a solid wall portion in alignment with outlet 60. Thus, outlet 62 is open and outlet 60 is closed. Coolant fluid is pumped from the first impeller chamber 53 through the jumper line 64 into inlet 30*b* of the second impeller chamber 55 shown in FIG. 7B via the mixing chamber 59 only shown in FIG. 5.

FIG. 7B shows the second impeller chamber 55 receives fluid from both inlets 30*a* and 30*b*. Inlet 30*a* of FIG. 7A, and inlet 30*b* is best seen in FIG. 5 but its flow is indicated by the lead line for 30*a*, 30*b*, in FIG. 7B. The third opening 84 is in alignment with the outlet 56 but a solid wall portion of the wall 81 is in alignment with outlet 58. Thus, fluid is pumped from the second impeller chamber 55 through open outlet 56 only because outlet 58 is closed.

Figure 8A:
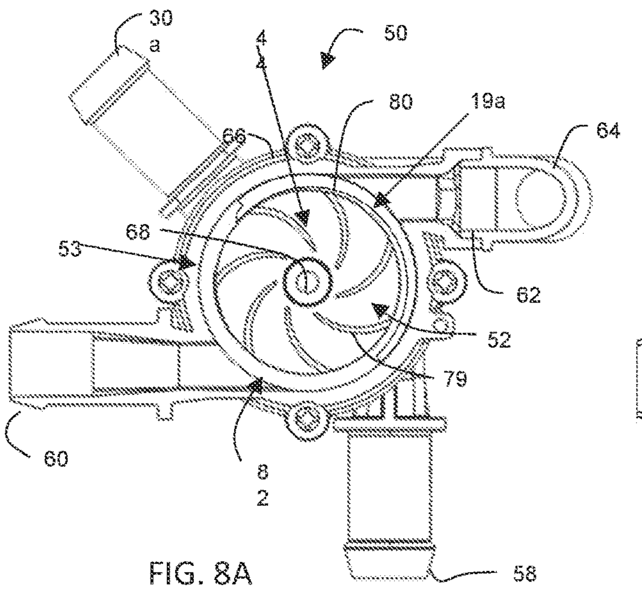
FIGS. 8A and 8B respectively illustrate a sectional view of a first impeller chamber and a second impeller chamber in a third switch position of a pump; and, FIGS. 9A and 9B respectively illustrate a sectional view of a first impeller chamber and a second impeller chamber in a fourth switch position of a pump.
Figure 8B:
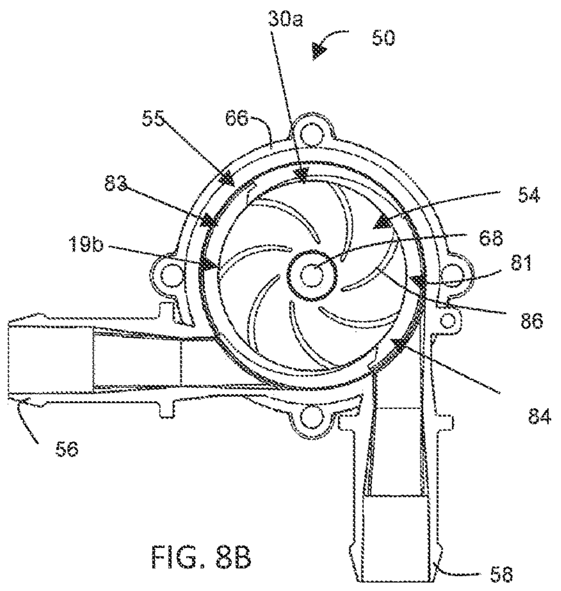

FIGS. 8A and 8B show the pump in the third switch position in the heating mode and the isolated state of FIG. 3. As shown in FIG. 8A, the first impeller chamber 53 receives coolant fluid from inlet 44. The valve 19 has been rotated 90° clockwise from the first switch position but still has opening 82 in alignment with outlet 60 and a solid wall portion is in alignment with opening 62. Thus, outlet 60 is open and outlet 62 is closed.

FIG. 8B shows the third opening 84 is in alignment with the outlet 58 but a solid wall portion of the wall 81 is in alignment with outlet 56. Thus, fluid is pumped from the second impeller chamber through open outlet 58 only while the outlet 56 is closed.

Figure 9A:
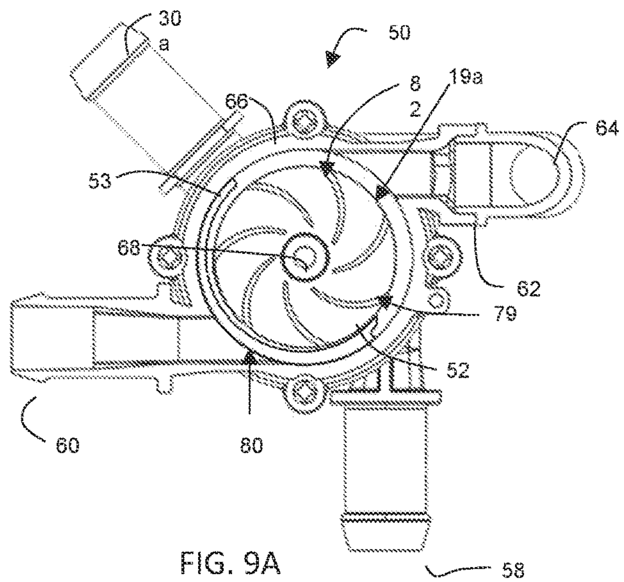
Figure 9B:
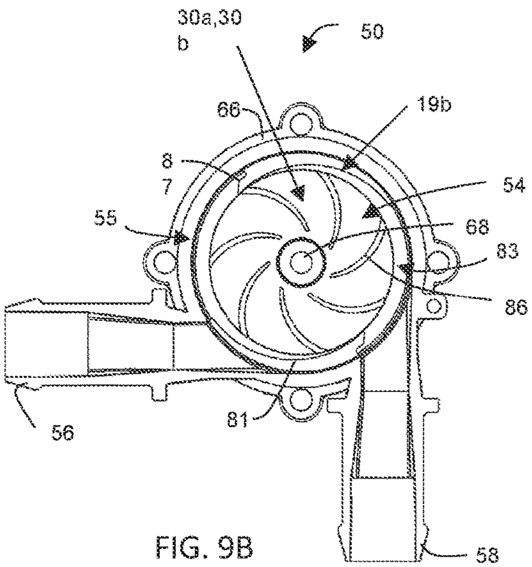

FIGS. 9A and 9B show the pump in the fourth switch position of the heating mode and the linked state of FIG. 4. As shown in FIG. 9A, the first impeller chamber 53 receives coolant fluid from inlet 44. The first valve opening 82 is in alignment with the fluid outlet 62, but a solid wall portion of the wall 80 is in alignment with outlet 60. Thus, outlet 62 is open and outlet 60 is closed.

FIG. 9B shows the second opening 83 is in alignment with the outlet 58 but a solid wall portion of the wall 81 is in alignment with outlet 56. Thus, fluid is pumped from the second impeller chamber through open outlet 58 only.

The disclosure sets for a process and apparatus that can control temperature of a heat generating component and a vehicle cabin by means of a pump with two impellers coaxially mounted on an axle without requiring separate valves and the additional fluid lines and controls appurtenant thereto.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words “means for” or “step for” are explicitly used in the particular claim, followed by a participle phrase identifying a function. Use of terms such as (but not limited to) “mechanism,” “module,” “device,” “unit,” “component,” “element,” “member,” “apparatus,” “machine,” “system,” or “controller” within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A process for cooling a heat generating component of a vehicle comprising:
- pumping a coolant fluid from a pump having a first impeller and a second impeller, the pump switchable from a chilling mode, a heating mode, an isolated state, and a linked state; and while the pump is in the chilling mode and the isolated state, pumping the coolant fluid with the first impeller through a first loop comprising a heater module, and a cabin heat exchanger, and pumping the coolant fluid with the second impeller through a second loop comprising a component heat exchanger and a chiller module.

2. The process of claim 1 wherein the first loop is independent of the second loop when the pump is in the isolated state, and the first loop communicates with the second loop when the pump is in the linked state.

3. The process of claim 2 wherein while the pump is in the chilling mode and the linked state pumping the coolant fluid from the first impeller to the second impeller, and the second impeller pumps the coolant fluid through the second loop.

4. The process of claim 3 while the pump is in the chilling mode and the linked state the first impeller also pumps the coolant fluid through the second loop.

5. The process of claim 1 wherein when the pump is in the heating mode and the isolated state pumping with the second impeller the coolant fluid directly to the component heat exchanger bypassing the chiller module.

6. The process of claim 5 wherein when the pump is in the heating mode and the isolated state pumping with the first impeller the coolant fluid through the first loop.

7. The process of claim 1 wherein when the pump is in the heating mode and the linked state the first impeller pumps the coolant fluid to the second impeller and the second impeller pumps the coolant fluid directly to the component heat exchanger bypassing the chiller module.

8. The process of claim 7 wherein the second impeller also pumps the coolant fluid into the first loop.

9. The process of claim 1 further comprising sensing the temperature of the coolant fluid entering the component heat exchanger to determine to operate the pump in the chilling mode if the temperature is higher than a first set point and to operate the pump in the heating mode if the temperature of the coolant fluid is lower than the first set point.

10. The process of claim 9 further comprising sensing the temperature of the coolant fluid entering the cabin heat exchanger to determine to operate the pump in the chilling mode if the temperature is above a second set point and to operate the pump in the heating mode if the temperature is below the second set point.

11. An apparatus for cooling a heat generating component of a vehicle comprising:
- a first loop comprising a heater module and a cabin heat exchanger;
- a second loop comprising a component heat exchanger and a chiller module;
- a pump having a first impeller and a second impeller, the pump switchable from a chilling mode, a heating mode, an isolated state, and a linked state; and, wherein when the pump is in the linked state the second impeller is in direct downstream communication with the first impeller, and when the pump is in the isolated state the first impeller pumps a coolant fluid through the first loop.

12. The apparatus of claim 11 wherein when the pump is in the chilling mode the second impeller pumps the coolant fluid through the second loop.

13. The apparatus of claim 12 wherein when the pump is in the heating mode the second impeller pumps the coolant fluid to the component heat exchanger bypassing the chiller module.

14. The apparatus of claim 11 further comprising a first temperature sensor to measure the temperature of the coolant fluid entering the component heat exchanger to determine if the temperature is higher than a first set point and to operate the pump in the chilling mode, and if the temperature is below the first set point to operate the pump in the heating mode.

15. The apparatus of claim 14 further comprising a second temperature sensor to measure the temperature of the coolant fluid entering the cabin heat exchanger to determine to operate the pump in the chilling mode if the temperature is above a second set point and to operate the pump in the heating mode if the temperature is below the second set point.

16. The apparatus of claim 11 further comprising a jumper pipe connecting an outlet of the second impeller to an inlet of the first impeller.

17. A process for cooling a heat generating component of a vehicle comprising:
- pumping a coolant fluid from a pump having a first impeller and a second impeller, the pump switchable from a chilling mode, a heating mode, an isolated state, and a linked state;
- wherein while the pump is in the chilling mode and the isolated state, pumping the coolant fluid with the first impeller through a first loop comprising a heater module, and a cabin heat exchanger, and pumping the coolant fluid with the second impeller through a second loop comprising a component heat exchanger and a chiller module; and wherein while the pump is in the chilling mode and the linked state, the first impeller pumps the coolant fluid to the second impeller and the second impeller pumps the coolant fluid through the first loop and the second loop.

18. The process of claim 17 further comprising when the pump is in the heating mode and the isolated state the first impeller pumps the coolant fluid through the first loop and the second impeller pumps the coolant fluid directly to the component heat exchanger bypassing the chiller module.

19. The process of claim 17 further comprising when the pump is in the heating mode and the linked state the first impeller pumps the coolant fluid to the second impeller and the second impeller pumps the coolant fluid directly to the component heat exchanger bypassing the chiller module.

20. The process of claim 17 wherein the first impeller is connected to the second impeller with a jumper pipe.

* * * * *